3,065,669
TISSUE CULTURE CHAMBER
Ernest V. Orsi, Pearl River, N.Y., assignor to American Cyanamid Company, New York, N.Y., a corporation of Maine
Filed July 19, 1960, Ser. No. 43,889
7 Claims. (Cl. 88—40)

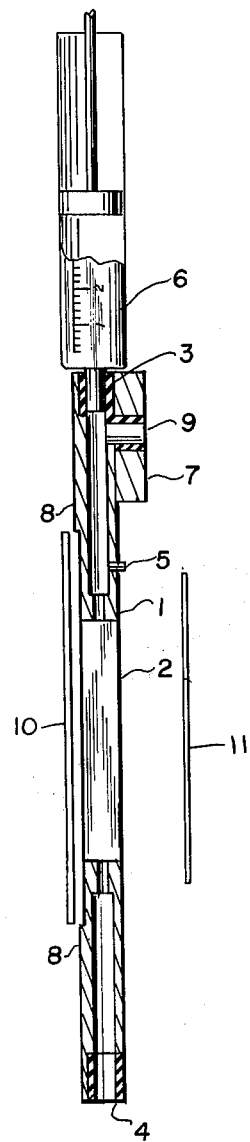
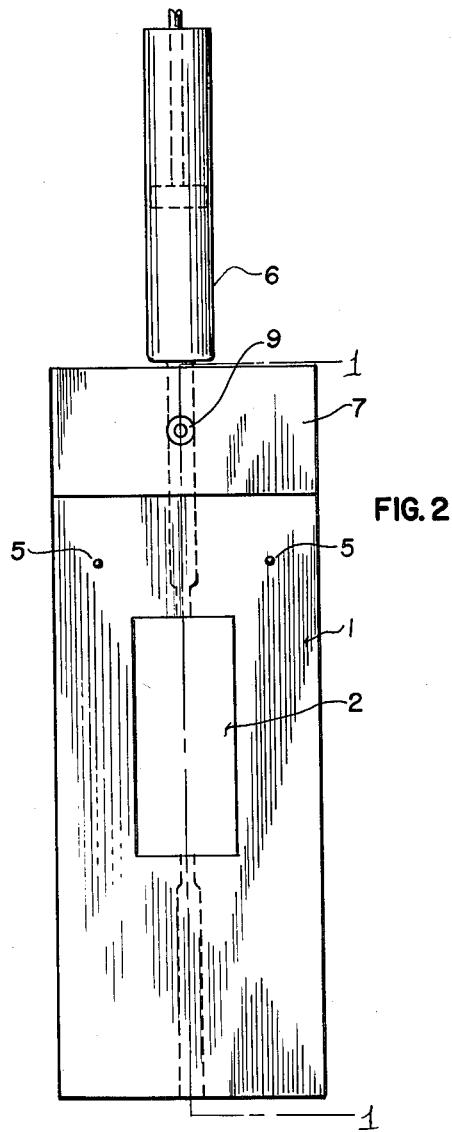

This invention relates to an improved tissue culture chamber for conventional and phase-microscopic examination.

Microscopic examination, particularly by phase-microscopy, of growing tissue cultures presents many problems. In the first place the tissue culture must be in a container of a suitable size and shape for placing on the microscope stage. Small culture dishes, slides, and tubes have been used in the past for conventional microscopes, but for phase-microscopy, these are not satisfactory because they have certain limitations. The tissue culture tube for instance, permits excellent culturing with suitable renewal of the culture medium and also contact with the atmosphere. Although it is convenient for most conventional purposes, it does not lend itself for use in phase-microscopy, because of the distortion of the optical path made by the curvature of the vessel.

The dish and slide which have been used for phase-microscopy are also not satisfactory, because they provide poorer culturing conditions than the tube mentioned above. These poor culturing conditions result in rapid cell degeneration and acid accumulation. The dish of the prior art is usually provided with a side port which permits introduction of fresh medium, but the problems set out above still remain.

The present invention provides the optical properties of the dish and slides and the tissue culturing properties of the tube without the inconveniences or drawbacks of the vessels formerly used. Rapid collection of culture fluids while maintaining sterility, makes it suitable for use in virus propagation. Essentially the present invention provides a flat dish, or really a frame with a central well which can be covered with microscope slides and slide covers, but there is provided in addition to the side port for introducing fresh medium at least one more side port which is connected to a controllable volume of sterile air. This side port may advantageously be connected to a syringe which is readily sterilizable and which constitutes the most convenient controllable source of a volume of air with which the culture is continuously in contact. For some purposes it is also desirable to have a third port which may advantageously be at right angles to the port into which a syringe can be connected. This port can be utilized when the chamber is filled to release pressure without disconnecting the syringe. Also the ports permit withdrawal from time to time of samples of the supernate liquid aseptically.

Closure of the side ports presents very little problem as they can be made tapered and closed with tapered stainless steel rods or rods of other suitable material. The syringe closes its own port and can be arranged to screw in with a tapered thread or any other desirable fastening.

The shape of the chambers of the present invention permits ready storage on racks in between periodic examinations under the microscope. In this respect they are fully as convenient as flat dishes which were used before.

The top and bottom of the well is formed of glass, as has been described above, which may be in the form of microscope slides or cover glasses. It is, of course, possible to have permanent transparent walls for the chamber, but this is less desirable as it renders cleaning and maintenance of aseptic conditions more difficult. A very simple and reliable method of forming the top and bottom of the chamber will be described below in conjunction with the description of a specific embodiment in connection with the drawings. Other similar methods may, of course, be used. In essence the present invention is not concerned with the particular way in which the transparent top and bottom of the chamber is produced.

It is an advantage of the present invention that the chamber does not require special or critical material. It is necessary, of course, that the material be non-toxic to the culture cells and virus which is being cultured, and it is of course also necessary that the material be sufficiently stable to permit periodic sterilization. Otherwise any suitable material can be used. Because of light weight and ready stamping to accurate shapes high melting plastics are advantageous and constitute the preferred material. However, the invention is concerned with other features and is not intended to be limited to the use of any particular type of material in its construction.

The invention will be described in greater detail in conjunction with the drawings showing a typical chamber and in which:

FIG. 1 is a vertical section along the line 1—1 of FIG. 2, and

FIG. 2 is a bottom plan view.

The chamber is made of a frame 1 with a central rectangular well 2 and two side ports 3 and 4. On the top of the frame there is a pair of shoulders 8 in which a microscope slide 10 can be fitted. The slide is shown separately as it is not a part of the permanent structure of the frame. It is applied with any suitable adhesive such as warmed paraffin plasticized with petrolatum. The heat of sterilization causes the paraffin-petrolatum mixture to flow and seal the components. On the bottom there are two pins (see FIG. 2), and a microscope cover glass 11 is mounted on the bottom, being centered by the pins. Cementing with plasticized paraffin can be used here too. In port 3 there is mounted a syringe 6 which can be adjusted to put the desired volume of sterile air in communication with the tissue culture which is later introduced into the well.

The drawings show a third port 9 at right angles to port 3. This is not essential as the chamber will function satisfactorily without it, but it is a convenience in filling the chamber for air relief and for periodic removal, if desired, of supernatant liquid. When the port 9 is incorporated it is necessary to have a greater thickness of plastic, and this is illustrated by a shoulder 7. The port 9 is tapered and may or may not be threaded as desired. Closure can be by a tapered wing bolt or by a tapered rod as is the case with port 4.

To carry out tissue culture in the vessel of the present invention the well is first closed top and bottom by microscope slides and cover glasses as has been described above. After sterilization a suitable tissue culture suspended in nutrient medium is introduced into the well through port 4. The port is then closed by a tapered stainless steel or other rod. As the drawing illustrates the chamber in its open form, the closure rods are of course not shown.

The tissue cells soon build a monolayer on the glass slides and the chamber is incubated by being kept on a rack at a suitable temperature. After the monolayer is established virus suspension may be introduced into the well in the same manner. The syringe 6 is adjusted to provide a predetermined volume of sterile air in communication with the culture. In general there will be an optimum volume for each type of culture and this cannot be calculated. Therefore, when a culture is first to be run the optimum syringe setting is found by experiment, and this is maintained in all further operations with the same culture. A very wide range of air volumes is possible from the very small volume when the syringe plunger is at zero, to the full volume of the syringe barrel.

It is, of course, necessary that the ports communicating with the well be reasonably liquid-tight, and this is easily assured by applying a very small amount of sterile silicone grease to the syringe and to the tapered rod closing port 9. From time to time chambers are removed from incubation and examined under a microscope. The chamber allows more variability on culturing conditions so that optimal conditions can be obtained. Therefore, less acid formation and cell degradation result than when a dish of fixed volume is used. A very close approximation to ideal conditions of a culture tube are obtained, and at the same time the chamber allows precise high power phase examination of normal and virus infected cultures which is not the case with the tube.

The importance of control of the sterile air volume in contact with the culture can well be brought out by the result of some tests with various cell cultures, for example HeLa cells. For this type of cell optimum air volume is approximately 5 cc. for a well size of about 1.5 cc. There is a considerable increase in acidity when the syringe plunger is at 0 cc. as compared to 5. Other cultures require different syringe volumes for optimum operating conditions.

The adjustable air volume syringe can be used to force excess liquid out of the port 4 before moving the syringe plunger to the desired point. Port 4 is enclosed with a tapered rod and this permits accurate and rapid filling with no air bubbles.

I claim:

1. A tissue culture chamber for phase contrast microscopic examination of sterile uninterrupted tissue cultures which comprises in combination a closed culture container of fixed volume and a variable volume air chamber connected thereto, said culture container comprising a flat frame of inert material having a vertical well extending therethrough, a pair of flat transparent slides sealed to the top and bottom surfaces of said frame and having inner surfaces extending across the opposite ends of said well, and providing tissue culture areas therein and a pair of side ports extending laterally through the material of said frame to the exterior thereof from portions of said well spaced vertically from said tissue cell growth areas, one of said ports having a removable closure therefor, and said variable volume air chamber being in such permanent, open and unencumbered communication with said culture container through the other of said ports as to permit the adjustment of the volume of the variable air chamber corresponding to the culture within the closed culture container.

2. A tissue culture chamber according to claim 1 in which the variable volume air chamber is a syringe.

3. A tissue culture chamber according to claim 2 in which the ports are tapered and the syringe hub is correspondingly tapered.

4. A tissue culture chamber according to claim 1 in which a third port, provided with a separate closure, communicates with one of the side ports at right angles thereto.

5. A tissue culture chamber according to claim 4 in which the variable volume air chamber is a syringe.

6. A tissue culture chamber according to claim 1 including means for orienting transparent cover slides for the well.

7. A tissue culture chamber according to claim 6 in which one of the orienting means is a shouldered recess.

References Cited in the file of this patent

UNITED STATES PATENTS

| 2,891,897 | Zetzsche | June 23, 1959 |
| 2,940,360 | Carter | June 14, 1960 |
| 2,942,520 | Rose | June 28, 1960 |